Oct. 16, 1956 J. W. JOHNSON 2,766,622
COMBINED SHORE WAVE HEIGHT AND DIRECTION
INDICATOR AND RECORDER
Filed June 28, 1954 3 Sheets-Sheet 1

INVENTOR.
JOE W. JOHNSON
BY *George Sipkin*
*George E. Pearson*
ATTORNEYS

Oct. 16, 1956 J. W. JOHNSON 2,766,622
COMBINED SHORE WAVE HEIGHT AND DIRECTION
INDICATOR AND RECORDER
Filed June 28, 1954 3 Sheets-Sheet 3

INVENTOR.
JOE W. JOHNSON
BY George Sipkin
George E. Pearson
ATTORNEYS

United States Patent Office 2,766,622
Patented Oct. 16, 1956

2,766,622

COMBINED SHORE WAVE HEIGHT AND DIRECTION INDICATOR AND RECORDER

Joe W. Johnson, Berkeley, Calif., assignor to the United States of America as represented by the Secretary of the Navy Application June 28, 1954, Serial No. 439,946

4 Claims. (Cl. 73—291)

The present invention relates to a combined shore wave height and direction indicator and recorder and more particularly to apparatus for converting wave direction and pressure into proportional electrical currents respectively and simultaneously recording the resulting currents on a suitable recorder such, for example, as a strip chart recorder, magnetic tape, or photographic recorder.

Until the present invention there has been no apparatus for simultaneously measuring the wave height (pressure) and direction, and in doing so, filtering out the effect of tides. My co-pending application, Serial No. 439,945, filed June 28, 1954, for a Shore Wave Recorder discloses an underwater pressure pickup unit for indicating pressure independent of tides but such apparatus does not indicate sufficient information necessary for making satisfactory comparison of actual wave data with forecast values.

The shore wave recorder of the present invention consists of an underwater transmitting assembly comprising a pressure pick-up unit (disclosed in my co-pending application above mentioned, a wave-direction indicator, and a tilt indicator. The shore wave recorder further comprises shore based bridge and power supply and a recording milliammeter of the Esterline-Angus graphic instrument type, connected to the underwater assembly by means of a submarine armored cable. Floats mark the spot and buoy up a wire rope which can be used to retrieve the underwater transmitting assembly if recovery is necessary.

An object of the present invention is the provision of apparatus to provide on the spot data for offshore construction, to provide wave information to the marine industries and for the design of coastal structures.

Another object is to provide wave measuring apparatus which avoids the obscuring effect of small local wind waves and which records only the effect of the larger waves which dominate the surf.

Another object is to provide apparatus for measuring both wave height and wave direction for comparison with wave forecast values.

Another object is to provide a transmitting assembly for measuring wave direction and height of waves having velocities up to 5½ feet per second and with accuracy from a depth of 80 feet below the surface.

Other objects and many of the attendant advantages of this invention will be readily appreciated as the same becomes better understood by reference to the following detailed description when considered in connection with the accompanying drawings wherein.

Figure 1:
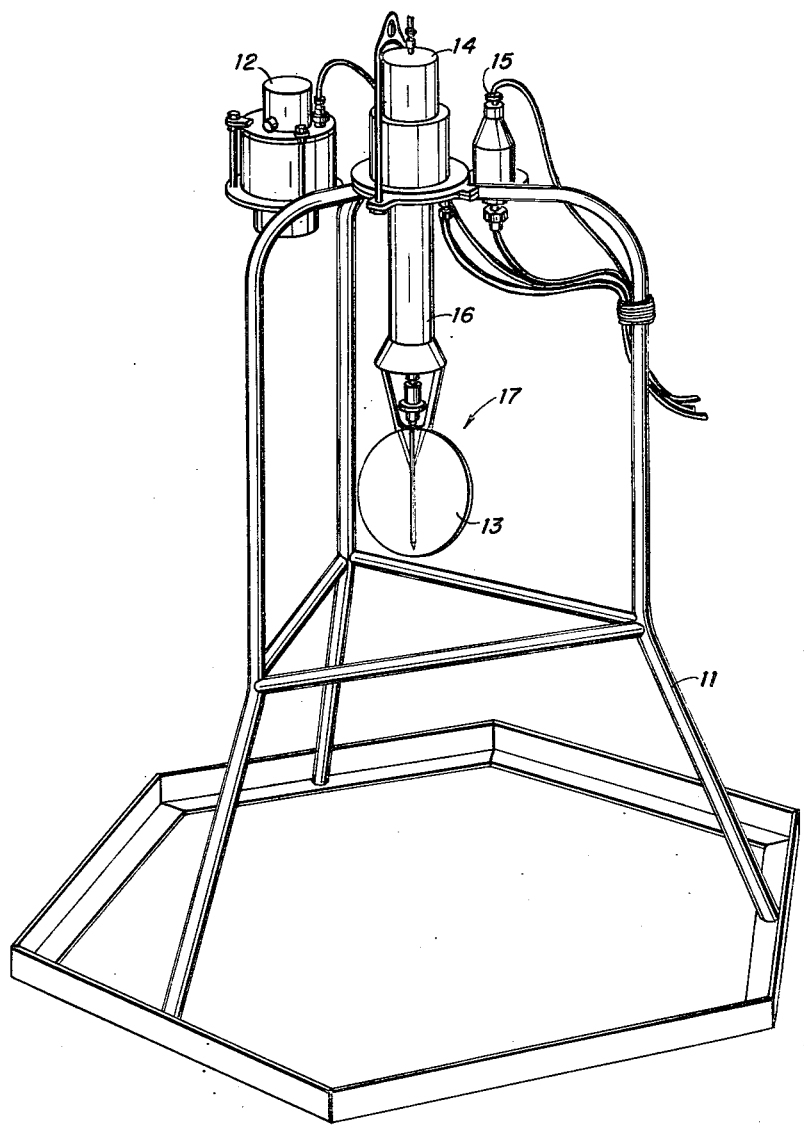
Fig. 1 is a pictorial view of the transmitting assembly comprising the pressure pick-up unit, Rayleigh disk, selsyn transmitter and tilt indicator mounted on a tetrahedron frame.
Figure 2:
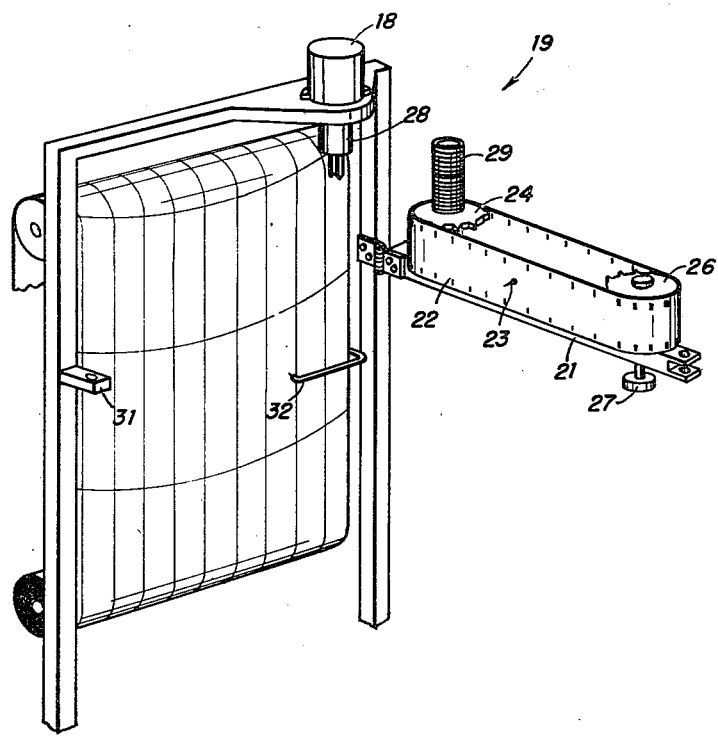
Fig. 2 is a schematic view of the receiving selsyn mounted on the shore based recorder, the direction recording pen mounting bracket being shown in open position.

Referring now to the drawings, wherein like reference characters designate like or corresponding parts throughout the several views, there is shown in Fig. 1 the underwater transmitting assembly comprising a tripod frame 11 supporting a differential pressure pick-up unit 12, a Rayleigh disk 13 operating a selsyn transmitter 14 and a tilt indicator 15. The differential pressure pick-up unit 12 is of the type described in my co-pending application NC–12686, in which an average sea water pressure including the effect of tides is exerted on one side of a cantilever beam and an instantaneous pressure due to overhead passage of waves is exerted on the other side. The end of the beam moves in response to the difference between these pressures and actuates the slide wire of a potentiometer. The potentiometer forms two arms of a Wheatstone bridge and is connected to the other two arms on shore. A recording unit such as shown in Fig. 2 is attached to the electric circuit and records the current fluctuations caused by varying the arms of the potentiometer which in turn is proportional to the differential pressure due to the wave height of passing waves. By making suitable calibrations, the actual wave height, independent of tidal effects, can be determined.

The wave direction indicator 17 employs a Raleigh disk 13 coupled to the shaft of the selsyn transmitter 14 centrally mounted on frame 11 for indicating the major direction of the incoming wave train. The operation of this direction indicator is based on the phenomenon that a disk placed in a moving fluid tends to move to a position where the normal to its surface is parallel to the direction of the fluid flow. The instantaneous torque, T, which tends to turn the plane of the disk normal to the direction of flow of the fluid is expressed by $T = 4/3 \rho r^3 V^2 \sin 2\theta$, where $\rho$ (rho) is the density of the fluid, $r$ is the radius of the disk, $V$ is the instantaneous velocity of fluid relative to the disk, and $\theta$ (theta) is the angle between the normal to the disk and the direction of undisturbed flow of fluid. If the fluid motion is not steady, the expression for average torque, T, for any value of $\theta$ is obtained by using the root mean square velocity for an interval of time. It is noted that the torque is a maximum when $\theta = 45°$.

Stuffing boxes have been avoided by mounting the shaft of the selsyn transmitter in an inverted oil-filled dome 16 using oil whose density is less than sea water for preserving its electrical insulation. In this manner the transmitter is not limited to any range of depths. The motion of the disk 13 is transmitted through electrical connections from the transmitter 14 to the receiving selsyn motor 18 on the shore based recording unit to operate a wave direction recording pen as will be hereinafter described.

Since the oil in the selsyn transmitter shaft housing dome 16 floats on sea water, it is necessary that the instrument remain upright during lowering of the underwater assembly and since the wave direction indicator 17 will not operate with accuracy beyond a 5° tilt, a tilt indicator 15 is installed on the frame 11 with suitable connections (not shown) to the shore assembly for indicating the degree of tilt. It is necessary therefore that the installation be made on a level section of the ocean surface and that the immediate site be free from rocks or other influences which might deflect the currents produced by the waves.

Fig. 2 shows the general arrangement of the receiving selsyn 18 mounted on an Esterline Angus recorder 19. Pivotally mounted on the recorder frame adjacent the recording paper is mounting bracket 21. Driving belt 22 to which is attached inking pen 23 is mounted on bracket 21 by a sprocket 24 and an idler 26. Idler 26 may be slidably moved along the bracket away from sprocket 24 and held in position by knurl knob 27 to hold the belt in operating condition.

The shaft 28 of selsyn 18 is connected to sprocket 24 through a flexible bellows coupling 29. In disengaging the pen 23 from the recording paper the coupling 29 is compressed to free it from engagement with the selsyn shaft 28 and the mounting bracket 21 is disengaged from its securing latch 31 and swung open.

Figure 3:
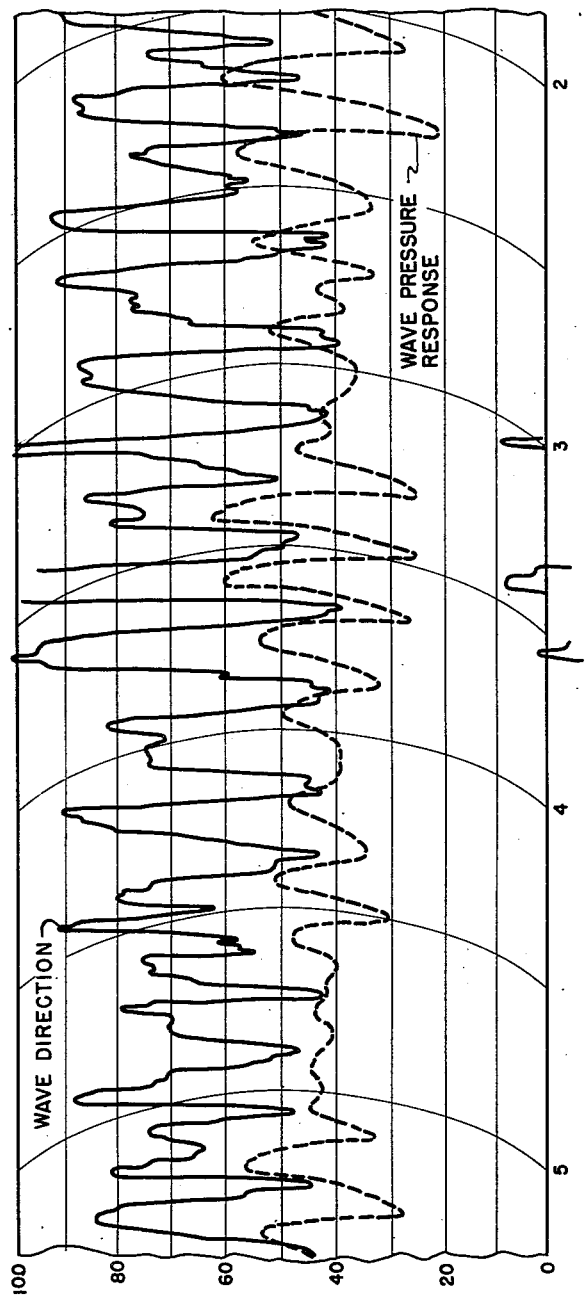
Fig. 3 shows a sample record from the combined wave direction indicator and shore wave recorder.

The pen 32 for recording wave height in response to the differential pressure in the pressure pick-up unit 12 is actuated by conventional means in the Esterline Angus recorder. Since wave height and wave direction are coexistent characteristics of any wave, both are measured simultaneously by the aforedescribed apparatus and the measurements are recorded simultaneously on the same chart, whereby concurrent readings of wave height and direction are obtained and readily distinguished from each other, for example, by using two different colors of ink in the pens. A sample of these combined records is shown in Fig. 3.

The records are analyzed with the use of a graphical transparent overlay, based on the instrument calibration and the known relationship of pressure fluctuation with the depth of the underwater assembly, to determine the wave period and height. From the wave record, with the aid of this transparent overlay, the measured characteristic heights obtained are transferred to the deepwater characteristics for comparison with forecast values.

For each installation refraction diagrams are drawn from available hydrographic charts for waves of various periods and direction to determine the corresponding refraction coefficients. For this reason the actual measurement of wave direction by direction indicator 17 is necessary to avoid error due to wave direction estimates.

The forecast values, with which the recorded values are compared, are based on the method described in Hydrographic Office Misc. Publication 11,275 "Wind Waves and Swell, Principles in Forecasting." This method gives the characteristic deep-water wave heights and periods and is not part of the present invention, but is mentioned to show why the combined wave height and direction records are necessary. Thus, further explanation of this method of forecasting wave information is not considered necessary to an understanding of the present invention.

Obviously many modifications and variations of the present invention are possible in the light of the above teachings. It is therefore to be understood that within the scope of the appended claims the invention may be practiced otherwise than as specifically described.

What is claimed is:

1. Apparatus for measuring simultaneously the height and direction of waves comprising a recording mechanism having a recording stylus responsive to wave height indications, a recording stylus responsive to wave direction indications, and one recording surface in contact with both said styli for simultaneously recording both indications on one surface, a first subsurface means responsive to and indicative of differential water pressure due to overhead passage of waves, a second subsurface means in close proximity to said first means responsive to and indicative of the direction of movement of said waves, means connecting said first subsurface means to said recording mechanism to operate said wave height recording stylus, and means connecting said second subsurface means to said recording mechanism to operate said wave direction recording stylus.

2. In wave height and direction measuring apparatus as set forth in claim 1, a frame for supporting said second subsurface means in upright position and means to indicate the degree of tilt of said frame.

3. In wave height and direction measuring apparatus, means responsive to a differential pressure due to overhead passage of waves, means simultaneously responsive to the direction of movement of said waves, and a shore based recording mechanism electrically connected to both said means for receiving the responses thereof and simultaneously recording both said responses on one recording surface, said means simultaneously responsive to the direction of movement of said waves comprising a disk adapted to revolve about a vertical axis in response to the direction of movement of said waves, a selsyn transmitting motor adapted to be electrically connected to a receiving selsyn motor on said recording mechanism, said disk connected to said transmitting motor for transmission of the response of said disk to said recording mechanism.

4. In wave height and direction measuring apparatus, as set forth in claim 3, a frame for supporting said disk in upright position and means to indicate the degree of tilt of said disk.

References Cited in the file of this patent

UNITED STATES PATENTS

| | | |
|---|---|---|
| 1,255,034 | Mason | Jan. 29, 1918 |
| 2,180,354 | Frazier | Nov. 21, 1939 |
| 2,287,786 | Diamond | June 30, 1942 |
| 2,384,739 | Hasbrook | Sept. 11, 1945 |
| 2,526,631 | Brady | Oct. 24, 1950 |
| 2,586,010 | Divoll | Feb. 19, 1952 |